Dec. 18, 1945.    M. MALLORY    2,391,176
INTERNAL-COMBUSTION ENGINE
Filed Feb. 7, 1945
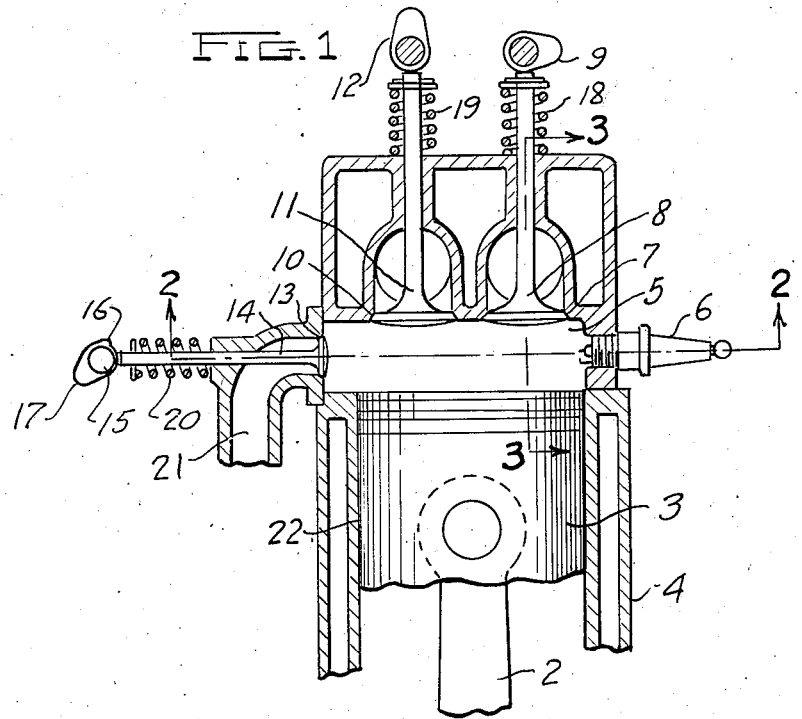
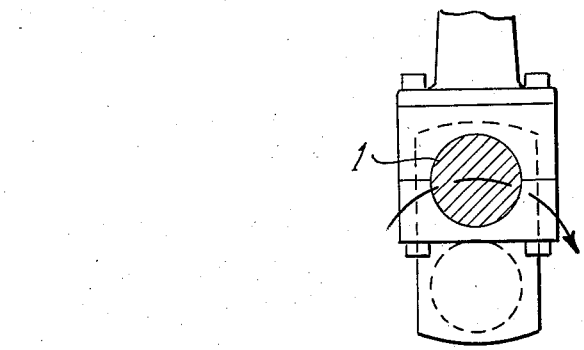
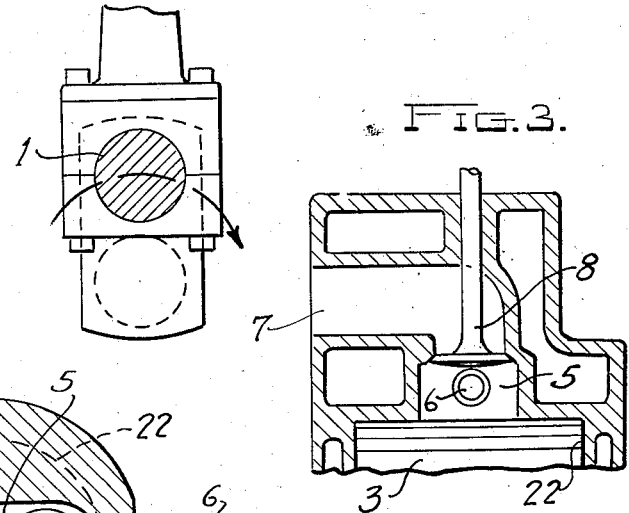
INVENTOR.
Marion Mallory
BY
Barnes, Kisselle, Laughlin & Raisch
Attorneys Patented Dec. 18, 1945

2,391,176

UNITED STATES PATENT OFFICE 2,391,176

INTERNAL-COMBUSTION ENGINE

Marion Mallory, Detroit, Mich.

Application February 7, 1945, Serial No. 576,587

5 Claims. (Cl. 123—191)

This invention relates to an internal combustion engine.

It is an object of this invention to produce an internal combustion engine which can be operated at extremely high compression and is therefore highly efficient.

This object is accomplished by controlling the compressed charge in the combustion chamber so that it is coolest and leanest in the area most remote from the point at which combustion starts so that the flame or combustion will spread or sweep evenly from the point at which it starts to the remote end of the combustion chamber without detonation.

My engine is so arranged that during combustion of the charge the flame propagation will be even and uniform from the point at which combustion starts to the remote leaner and cooler mixture areas so that the pressure of the unburned charge will not be raised by the pressure of the burning charge to a point that it will self-ignite and cause detonation.

Fig. 1 is a fragmentary vertical section through my engine.

Fig. 2 is a section along the line 2—2 of Fig. 1.

Fig. 3 is a section along the line 3—3 of Fig. 1.

The elements of my engine are referenced as follows: crankshaft 1, connecting rod 2, piston 3, cylinder 4, combustion chamber 5, spark plug 6, exhaust port 7, exhaust valve 8, exhaust valve cam 9, fuel-air mixture intake port 10, intake valve 11, intake valve cam 12, compressed air port 13 controlled by valve 14, cam shaft 15, cams 16 and 17 for controlling valve 14, valve springs 18, 19, 20, conduit 21 connecting port 13 with the source of compressed air (not shown), and cylinder 22.

It will be noted that my engine is provided with a special combustion chamber 5 in the form of an elongated tunnel or channel. For purposes of description but not by way of limitation, the length of the combustion chamber 5 is shown as approximately equal to the diameter of engine cylinder 22 and the width is slightly less than the radius of the cylinder. Specific dimensions as to length, width and height of the combustion chamber are not important, but it is important that the combustion chamber take the form of a tunnel for reasons pointed out below. It should also be noted that the spark plug and the exhaust port and exhaust valve are located in one end of the combustion chamber and the intake port, intake valve and the air inlet port and air valve are located in the other end of the combustion chamber.

The operation of my engine is as follows: As piston 3 moves downwardly a fuel-air mixture, preferably carburetted, is drawn in through port 10 by valve 11 which is open. Exhaust valve 8 and valve 14 are closed. After the piston is started back or upwardly on its compression stroke, then somewhere on the compression stroke cam 17 opens valve 14 and air under compression is forced through port 13 into the combustion chamber. Valves 8 and 11, of course, will be closed on the compression as well as power stroke of the engine. Valve 14 preferably closes when the piston is about 100° before dead center. The pressure of the charging air admitted through port 13 is less than the maximum compression pressures of the fuel-air mixture created by piston 3. Valve 14 preferably closes when the compression pressure and the air charging pressure are approximately balanced. Commingling of the air from port 13 and the fuel-air mixture in the combustion chamber decreases as the compression pressure rises and ceases as the air charging and compression pressures balance. This compressed air cools the combustion chamber more so at the end where port 13 is located than the end where spark plug 6 and exhaust valve 8 are located, and forces the fuel mixture back around the spark plug in the other end of the combustion chamber. The mixture will be richer and hotter in the end of the combustion chamber where ignition starts, that is, at spark plug 6, than at the opposite end of the combustion chamber. The richer mixture will be in and around the spark plug and the mixture will be gradually leaner toward the other end of the combustion chamber with the leanest mixture being present about valve 14. Ignition now takes place at or near the end of the compression stroke when the charge is in combustion chamber 5 above the cylinder. The rich mixture at spark plug 6 and exhaust valve 8 starts to burn and expands outwardly toward the other end of the combustion chamber burning in a smooth wave because the burning flame is moving toward a cooler part of the combustion chamber and the flame is also traveling in the direction towards which the mixture gets leaner. The flame finally is extinguished or dissipated in the air or exceedingly lean mixture at the end of the combustion chamber nearest port 13. Thus, in my engine the burning wave is slower even though high compression is used and thus the combustion pressures will be high even after the crankshaft has turned to its position where the combustion pressure can exercise maximum leverage. The compressed air charge through conduit 21 can be throttled the same as the charge is throttled through the carburetor (not shown) connected to intake port 10.

Small cam 16 is timed to momentarily open air valve 14 when the piston has reached the end of the exhaust stroke so that a small charge of compressed air flows through the combustion chamber and out through exhaust port 7 to clear out the burned gases. This additional gush of air through the combustion chamber caused by small cam 16 also cools exhaust valve 8. In my engine the overall ratio of the fuel mixture can be leaner than normal but a normal mixture ratio can be used and in such case a richer mixture than normal would enter the combustion chamber through intake port 10 and then be diluted by the compressed air charge from port 13.

Instead of admitting a carburetted charge through intake port 10 on the intake stroke of piston 3, air could be drawn into the combustion chamber through port 10 and fuel injected into the combustion chamber to commingle with said air preparatory to opening valve 14.

I claim:

1. An internal combustion engine comprising a cylinder, a reciprocating piston in said cylinder, a combustion chamber at the upper end of said cylinder, ignition means positioned adjacent one end of the combustion chamber, a valve controlled exhaust port adjacent said same end of the combustion chamber, a valve controlled port for admitting air under pressure into said combustion chamber and positioned at the other end of the combustion chamber opposite the ignition means, and a valve controlled intake port also adjacent said other end of the combustion chamber through which a fuel mixture flows into the combustion chamber preparatory to admitting a charge of compressed air through said air inlet port whereby the compressed air charge cools the inlet port end of the combustion chamber and causes the fuel mixture to be richer at the ignition means end of the combustion chamber than at the opposite end of the chamber so that the combustion flame travels from the ignition means end of the combustion chamber toward the other end without pre-ignition of the fuel mixture as the pressure rises due to combustion.

2. An internal combustion engine comprising a cylinder, a reciprocating piston in said cylinder, a combustion chamber at the upper end of said cylinder, ignition means positioned adjacent one end of the combustion chamber, a valve controlled exhaust port adjacent said same end of the combustion chamber, a valve controlled port for admitting air under pressure into said combustion chamber and positioned at the other end of the combustion chamber opposite the ignition means, and means for supplying a fuel mixture charge into the combustion chamber preparatory to admitting a charge of compressed air through said air inlet port whereby the compressed air charge cools the inlet port end of the combustion chamber and causes the fuel mixture to be richer at the ignition means end of the combustion chamber than at the opposite end of the chamber so that the combustion flame travels from the ignition means end of the combustion chamber toward the other end without pre-ignition of the fuel mixture as the pressure rises due to combustion.

3. An internal combustion engine comprising a cylinder, a reciprocating piston in said cylinder, an elongated combustion chamber in the form of a channel at the upper end of said cylinder, ignition means positioned adjacent one end of the combustion chamber, a valve controlled exhaust port adjacent said same end of the combustion chamber, a valve controlled port for admitting air under pressure into said combustion chamber and positioned at the other end of the combustion chamber opposite the ignition means, and a valve controlled intake port also adjacent said other end of the combustion chamber through which a carburetted fuel mixture flows into the combustion chamber preparatory to admitting a charge of compressed air through said air inlet port whereby the compressed air charge cools the inlet port end of the combustion chamber and causes the fuel mixture to be richer at the ignition means end of the combustion chamber than at the opposite end of the chamber so that the combustion flame travels from the ignition means end of the combustion chamber toward the other end without pre-ignition of the fuel mixture as the pressure rises due to combustion.

4. An internal combustion engine comprising a cylinder, a reciprocating piston in said cylinder, a combustion chamber at the upper end of said cylinder, ignition means positioned adjacent one end of the combustion chamber, a valve controlled exhaust port adjacent said same end of the combustion chamber, a port for admitting air under pressure into said combustion chamber and positioned at the other end of the combustion chamber opposite the ignition means, a valve for controlling said air port, cam means for controlling said air port valve, said cam means opening said air port valve when the piston is near the end of the exhaust stroke to clear out the burned exhaust gases through the exhaust port, said cam means also opening said air port valve during the compression stroke of the piston, and a valve controlled intake port also adjacent said other end of the combustion chamber through which a fuel mixture flows into the combustion chamber preparatory to admitting a charge of compressed air through said air inlet port whereby the compressed air charge cools the inlet port end of the combustion chamber and causes the fuel mixture to be richer at the ignition means end of the combustion chamber than at the opposite end of the chamber so that the combustion flame travels from the ignition means end of the combustion chamber toward the other end without pre-ignition of the fuel mixture as the pressure rises due to combustion.

5. An internal combustion engine comprising a cylinder, a reciprocating piston in said cylinder, an elongated combustion chamber in the form of a channel at the upper end of said cylinder, ignition means positioned adjacent one end of the combustion chamber, a valve controlled exhaust port adjacent said same end of the combustion chamber, a port for admitting air under pressure into said combustion chamber and positioned at the other end of the combustion chamber opposite the ignition means, a valve controlling said air port arranged to open during the compression stroke of the piston and close before the piston reaches top dead center when approximately the compression pressure in the combustion chamber balances the pressure of the air charge, and a valve controlled intake port also adjacent said other end of the combustion chamber through which a carburetted fuel mixture flows into the combustion chamber preparatory to admitting the charge of compressed air through said air inlet port whereby the compressed air charge cools the inlet port end of the combustion chamber and causes the fuel mixture to be richer at the ignition means end of the combustion chamber than at the opposite end of the chamber so that the combustion flame travels from the ignition means end of the combustion chamber toward the other end without pre-ignition of the fuel mixture as the pressure rises due to combustion.

MARION MALLORY.